United States Patent
Tanaka

(10) Patent No.: US 9,895,939 B2
(45) Date of Patent: Feb. 20, 2018

(54) RUN-FLAT TIRE AND METHOD FOR MOUNTING THE SAME ON FOUR-WHEELED VEHICLE

(71) Applicant: SUMITOMO RUBBER INDUSTRIES, LTD., Kobe-shi, Hyogo (JP)

(72) Inventor: Susumu Tanaka, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 907 days.

(21) Appl. No.: 14/238,072

(22) PCT Filed: Oct. 5, 2012

(86) PCT No.: PCT/JP2012/075957
§ 371 (c)(1),
(2) Date: Feb. 10, 2014

(87) PCT Pub. No.: WO2013/054757
PCT Pub. Date: Apr. 18, 2013

(65) Prior Publication Data
US 2014/0173900 A1    Jun. 26, 2014

(30) Foreign Application Priority Data
Oct. 12, 2011  (JP) ................. 2011-225161

(51) Int. Cl.
*B60C 17/00*  (2006.01)
*B60C 3/06*   (2006.01)
(Continued)

(52) U.S. Cl.
CPC ........ *B60C 17/0009* (2013.01); *B60C 19/001* (2013.01); *B60C 3/06* (2013.01);
(Continued)

(58) Field of Classification Search
CPC ............. Y10T 152/10504; B60C 3/06; B60C 15/0236; B60C 19/001; B60C 17/0009;
(Continued)

(56) References Cited

U.S. PATENT DOCUMENTS 5,058,646 A * 10/1991 Kajikawa ............ B60C 17/0009
                                                    152/517 X
5,158,627 A * 10/1992 Saneto ................ B60C 17/0009
                                                    152/517 X
(Continued)

FOREIGN PATENT DOCUMENTS

| JP | 10-138719 A | 5/1998 |
| JP | 2006-315580 A | 11/2006 |
| JP | 2007-516883 A | 6/2007 |

OTHER PUBLICATIONS

English machine translation of JP 2006-315580 A, Nov. 24, 2006.*
International Search Report, dated Dec. 25, 2012, issued in PCT/JP2012/075957.

*Primary Examiner* — Adrienne C Johnstone
(74) *Attorney, Agent, or Firm* — Birch, Stewart, Kolasch & Birch, LLP

(57) ABSTRACT

A run-flat tire 1 comprises a carcass 6, a pair of side reinforcing rubber layers 9, and a pair of sidewall rubber components 10. At a tire maximum-width position, a first side reinforcing rubber layer 9A disposed in the side of a first bead portion has a thickness B1 greater than a thickness B2 of a second side reinforcing rubber layer disposed in the side of a second bead portion, and a first sidewall rubber component disposed in the side of the first bead portion has a thickness A1 smaller than a thickness A2 of a second sidewall rubber component disposed in the side of the second bead portion.

10 Claims, 3 Drawing Sheets

(51) Int. Cl.
  *B60C 19/00*   (2006.01)
  *B60C 13/00*   (2006.01)
(52) U.S. Cl.
  CPC ............. *B60C 2013/007* (2013.01); *B60C 2017/0063* (2013.01); *B60C 2017/0072* (2013.01); *Y10T 29/49494* (2015.01); *Y10T 152/10504* (2015.01)
(58) Field of Classification Search
  CPC ........... B60C 17/0018; B60C 17/0027; B60C 17/0036; B60C 17/0045; B60C 17/00; B60C 2017/0072; B60C 2017/0063
  USPC .......................................... 152/455, 456, 517
  See application file for complete search history.

(56) References Cited

U.S. PATENT DOCUMENTS

| | | | |
|---|---|---|---|
| 5,299,615 A * | 4/1994 | Ataka | B60C 17/0009 152/517 X |
| 6,510,883 B2 * | 1/2003 | Baumann | B60C 17/0009 152/517 X |
| 9,340,073 B2 * | 5/2016 | Horiuchi | |
| 2007/0012391 A1 | 1/2007 | Willard, Jr. | |

* cited by examiner

RUN-FLAT TIRE AND METHOD FOR MOUNTING THE SAME ON FOUR-WHEELED VEHICLE

TECHNICAL FIELD

The present invention relates to a run-flat tire that may travel in long distance even when punctured and a method for mounting the run-flat tire on a four-wheeled vehicle, and more particularly to a run-flat tire that may deliver excellent run-flat performance while preventing deterioration of its uniformity and productivity.

BACKGROUND ART

Conventionally, a run-flat tire that may travel in a certain long distance when punctured is well known. The run-flat tire usually includes a pair of sidewall portions each of which is reinforced by a side reinforcing rubber layer with a crescent cross-sectional shape. In order to improve run-flat performance of the tire, a run-flat tire having a side reinforcing rubber layer with a large volume is proposed. The run-flat tire, however, is liable to deteriorate ride comfort and fuel consumption due to its increased vertical spring constant and mass.

Furthermore, a four-wheeled vehicle (hereinafter, it may be simply referred to as a vehicle) usually has rear wheels with a negative camber alignment. Thus, the run-flat tires installed on the rear wheels of the vehicle are subjected to large tire load on its inboard during run-flat traveling, and damage tends to concentrate to the inboard of the tire. On the other hand, the run-flat tires installed on the front wheels of a vehicle are subjected to large tire load on its outboard when cornering, and damage tends to concentrate to the outboard of the tire.

In view of above, Japanese Unexamined Patent Application Publication mentioned below discloses a run-flat tire having a pair of side reinforcing rubber layers with the different thicknesses that is intended to install to a vehicle so that the side reinforcing rubber layer with the relatively large thickness is disposed on the side of the wheel where damage tends to concentrate (namely, the inboard on the rear wheels, or the outboard on the front wheels).

RELATED ART DOCUMENTS

Patent Documents

[Patent Document 1]
Japanese Unexamined Patent Application Publication No. 10-138719

SUMMARY OF INVENTION

Problem to be Solved by the Invention

The run-flat tire described above, however, tends to have a problem of lacking uniformity based on the sidewall portions having different masses. Furthermore, since the run-flat tire described above has an inner cavity surface of an unsymmetrical shape with respect to its tire equator, the run-flat tire may be difficult to mold using a conventional standard bladder. Thus, since a special bladder for molding the run-flat tire above is necessary, the run-flat tire tends to have poor productivity.

The present invention has been worked out in light of the circumstances described above, and has a main object of providing a run-flat tire that may deliver excellent run-flat performance while preventing deterioration of its uniformity and productivity, and a method for mounting the run-flat tire on a four-wheeled vehicle.

Means for Solving the Problem

In accordance with the present invention, there is provided a run-flat tire comprising a carcass extending between bead cores each disposed in a first bead portion and a second bead portion, through a tread portion and sidewall portions, a pair of side reinforcing rubber layers made of rubber having a high hardness, and each having a crescent cross-sectional shape and disposed axially inside of the carcass in each sidewall portion, and a pair of sidewall rubber components each disposed axially outside of the carcass in each sidewall portion, wherein the side reinforcing rubber layers comprise a first side reinforcing rubber layer disposed in the side of the first bead portion, and a second side reinforcing rubber layer disposed in the side of the second bead portion, wherein the sidewall rubber components comprise a first sidewall rubber component disposed in the side of the first bead portion, and a second sidewall rubber component disposed in the side of the second bead portion, and wherein at a tire maximum width position in a tire cross section including a tire axis under a standard condition in which the tire is mounted on a standard rim and is inflated to a standard pressure, but no tire load is loaded, the first side reinforcing rubber layer has a thickness B1 greater than a thickness B2 of the second side reinforcing rubber layer, and the first sidewall rubber component has a thickness A1 smaller than a thickness A2 of the second sidewall rubber component.

Effects of the Invention

The run-flat tire in accordance with the present invention includes a pair of side reinforcing rubber layers made of high hardness rubber and each having a crescent cross-sectional shape in each sidewall portion. The side reinforcing rubber layers comprise a first side reinforcing rubber layer disposed in the side of a first bead portion, and a second side reinforcing rubber layer disposed in the side of a second bead portion, wherein the first side reinforcing rubber layer has a thickness B1 greater than a thickness B2 of the second side reinforcing rubber layer. Thus, the run-flat tire may reduce deformation in the side of the first bead portion. Accordingly, durability of the run-flat tire may be improved by providing the first bead portion to the wheel position of a vehicle where damage tends to concentrate. Furthermore, the run-flat tire may reduce its mass and vertical spring constant in the side of the second bead portion due to the relatively thin thickness of the second side reinforcing rubber layer, thereby improving ride comfort and fuel consumption of the tire.

The run-flat tire in accordance with the present invention includes a pair of sidewall rubber components including a first sidewall rubber component disposed in the side of the first bead portion, and a second sidewall rubber component disposed in the side of the second bead portion, wherein the first sidewall rubber component has a thickness A1 smaller than a thickness A2 of the second sidewall rubber component. Namely, the relatively thick side reinforcing rubber layer and the relatively thin sidewall rubber component are arranged at the side of the first bead portion, and the relatively thin side reinforcing rubber layer and the relatively thick sidewall rubber component are arranged at the side of the second bead portion. Accordingly, since the run-flat tire in accordance with the present invention may offer substantially same thicknesses of the tire at its respective sidewall portions, excellent uniformity may be delivered due to balanced mass at the respective sidewall portions.

Furthermore, the run-flat tire in accordance with the present invention may have an inner cavity surface having a symmetrical shape with respect to a tire equator based on the respective sidewall portions with same thicknesses. Since the run-flat tire in accordance with the present invention may be molded using a conventional bladder, better productivity may be achieved.

MODE FOR CARRYING OUT THE INVENTION

An embodiment of the present invention is described in detail below with reference to the accompanying drawings.

Figure 1:
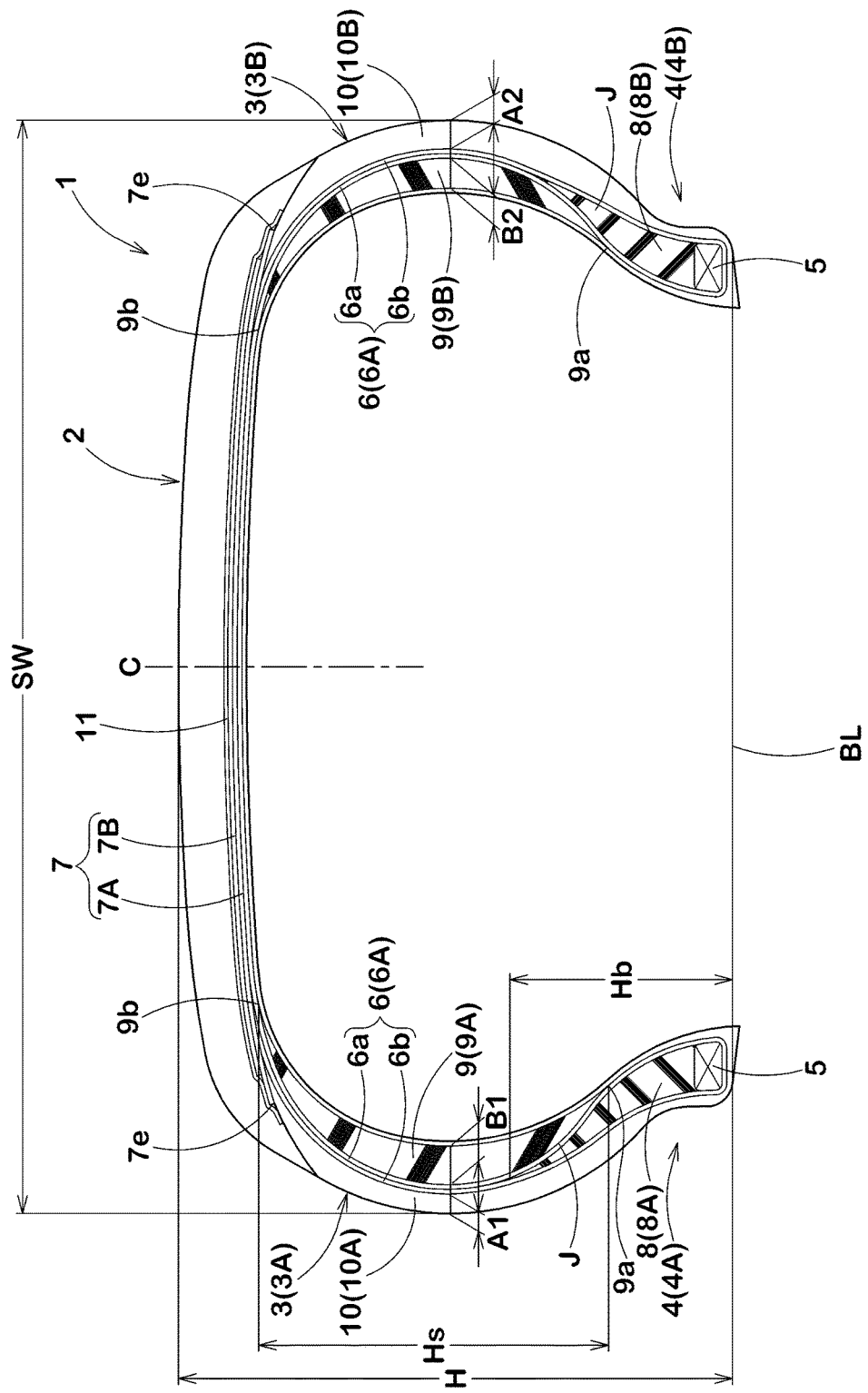
FIG. 1 is a cross-sectional view illustrating a run-flat tire in accordance with an embodiment of the present invention.
Figure 2:
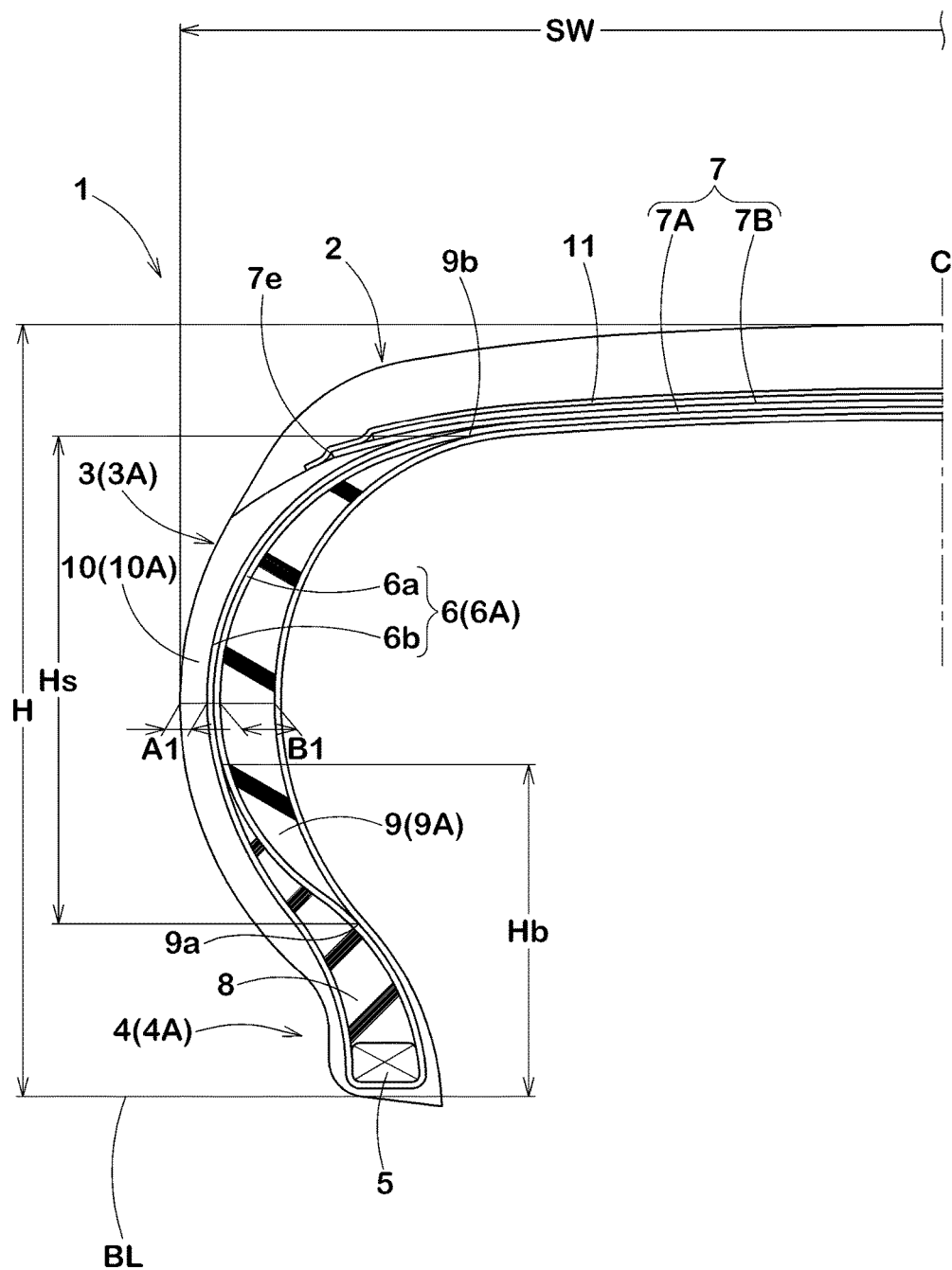
FIG. 2 is an enlarged view illustrating a first bead portion.
Figure 3:
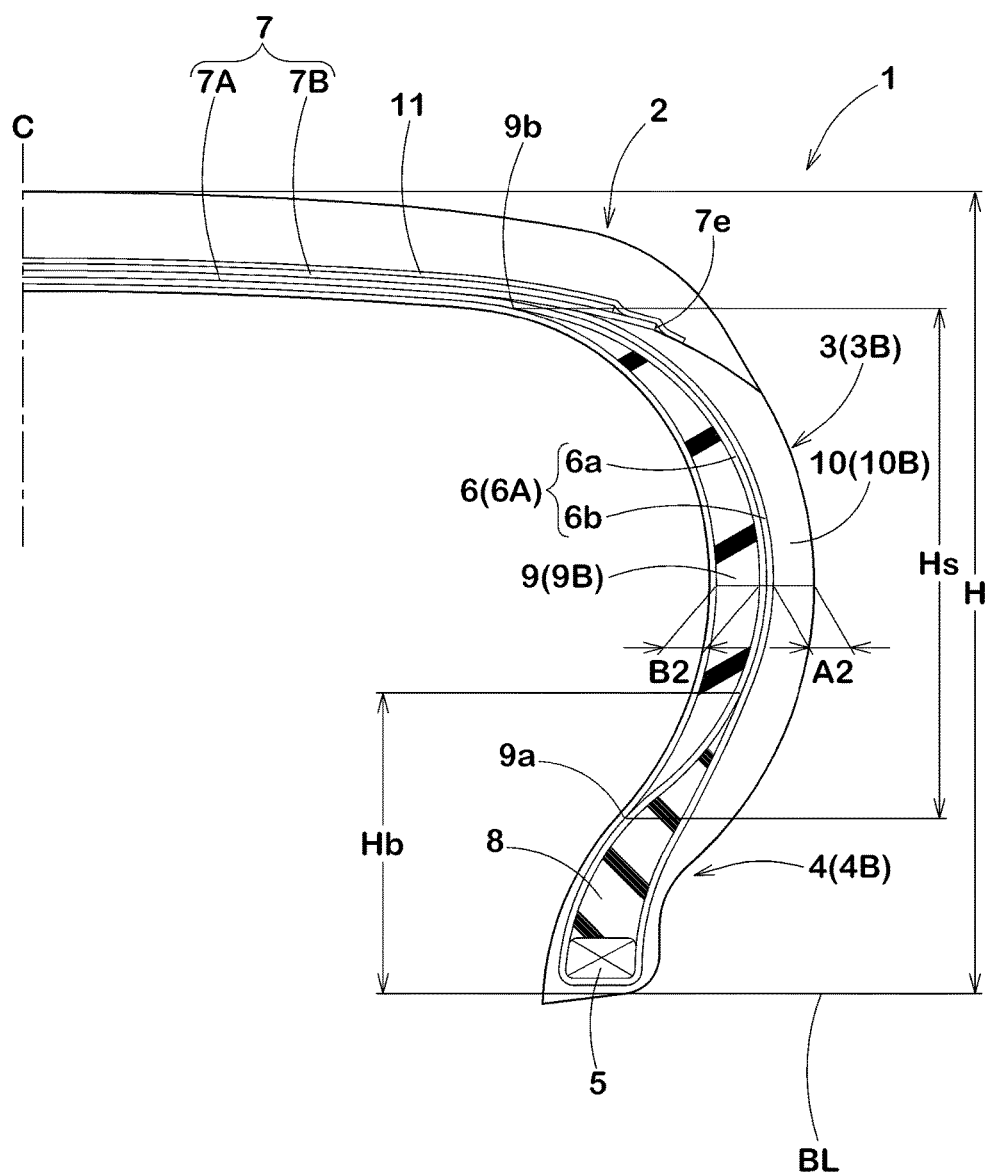
FIG. 3 is an enlarged view illustrating a second bead portion.

FIG. 1 illustrates a cross-sectional view of a run-flat tire 1 including a tire axis under a standard condition, in accordance with an embodiment of the present invention. FIG. 2 is an enlarged view illustrating a first bead portion 4A of FIG. 1, and FIG. 3 is an enlarged view illustrating a second bead portion 4B of FIG. 1.

Here, the standard condition is such that the tire 1 is mounted on a standard wheel rim (not shown) and is inflated to a standard pressure but loaded with no tire load. In this application including specification and claims, various dimensions, positions and the like of the tire refer to those under the standard condition of the tire unless otherwise noted.

The standard wheel rim is a wheel rim officially approved for the tire by standards organizations, and the standard wheel rim is the "standard rim" specified in JATMA, the "Measuring Rim" in ETRTO, the "Design Rim" in TRA or the like, for example. The standard pressure is a pressure officially approved for the tire by standards organizations, and the standard pressure is the "maximum air pressure" in JATMA, the "Inflation Pressure" in ETRTO, and the maximum pressure given in the "Tire Load Limits at Various Cold Inflation Pressures" table in TRA or the like. However, in case of a passenger car tire, the standard pressure is uniformly defined as 180 kPa.

As shown in FIG. 1, the run-flat tire 1 in accordance with the present embodiment includes a carcass 6 extending between bead cores 5 disposed in bead portions 4 through a tread portion 2 and sidewall portions 3, a belt layer 7 disposed radially outward of the carcass 6 in the tread portion 2, a pair of bead apex rubber components 8 each tapering radially outwardly from each bead core 5, and a pair of side reinforcing rubber layers 9 each having a crescent cross-sectional shape and disposed axially inside the carcass 6 in each sidewall portion 3.

The carcass 6 includes at least one carcass ply 6A of cords which comprises a main portion 6a extending between bead cores 5, 5 through the tread portion 2 and sidewall portions 3, and a pair of turn-up portions 6b each turned up around the bead core 5 from the axially inside to the outside of the tire.

In this embodiment, the carcass cords are arranged at an angle in a range of from 75 to 90 degrees with respect to a tire equator C. For the carcass cords, organic fiber cords, e.g. polyester, nylon, rayon, aramid and the like are preferably used. For the carcass cords, steel cords may be used.

The turn-up portion 6b of the carcass ply 6A is preferably located more outside than the outer end of the bead apex rubber component 8 in the radial direction of the tire. More preferably, the turn-up portion 6b of the carcass ply 6A is located in between the belt layer 7 and the main portion 6a of the carcass ply 6A as shown in FIG. 1. Thus, the bending rigidity of the sidewall portion 3 may effectively be enhanced, thereby further improving run-flat performance.

The belt layer 7 includes at least one belt ply of belt cords laid at an angle in a range of from 10 to 40 degrees with respect to the tire equator C. In this embodiment, the belt layer 7 includes two belt plies 7A and 7B overlapped each other so that each belt cords of plies are crossed. While steel cords are employed for the belt cords in this embodiment, aramid or rayon cords may be employed.

A band layer 10 having band cords laid at angle of less than 5 degrees with respect to the circumferential direction of the tire is preferably disposed on the belt layer 7.

The bead apex rubber component 8 is disposed between the main portion 6a and the turn-up portion 6b of the carcass ply 6A in each bead portion 4. Each bead apex rubber component 8 tapers radially outward from the bead core 5.

Since the bead apex rubber components 8 are made of rubber having a high hardness, the bending rigidity of the sidewall portions 3 and bead portions 4 may be enhanced so that the deformation thereto is reduced. In view of above, the bead apex rubber component 8 preferably has a complex elastic modulus in a range of not less than 5 MPa, more preferably not less than 8 MPa. When the complex elastic modulus of the bead apex component 8 is less than 5 MPa, it may be difficult to obtain sufficient run-flat performance. Meanwhile, when the complex elastic modulus of the bead apex component 8 is too large, ride comfort during ordinary drive may be deteriorated. Thus, the bead apex rubber component 8 preferably has its complex elastic modulus in a range of not more than 15 MPa, more preferably not more than 12 MPa.

In this specification and claims, the complex elastic modulus of rubber is measured based on JIS-K6394 using a visco-elasticity spectrometer manufactured by Iwamoto Seisakusho Co. under the condition at a temperature of 70 degrees C., frequency of 10 Hz, initial strain of 10%, amplitude of Dynamic strains of +/−1%, and a tensile deformation mode.

The respective bead apex rubber components 8 have symmetric shape with respect to the tire equator C. The respective bead apex rubber components 8 preferably have a radial height Hb from the bead base line B1 to its outer ends in a range of not less than 10%, more preferably not less than 25%, in relation to the tire section height H. When the height Hb is less than 10% in relation to the tire section height H, the tire mass may increase, and ride comfort may be deteriorated. In view of above, the height Hb is preferably set in a range of not more than 50%, more preferably not more than 45%, in relation to the tire section height H.

Each side reinforcing rubber layer 9 includes a center portion having its maximum width and both end portions tapering from the center portion so as to have a crescent cross-sectional shape. The side reinforcing rubber layers 9 include a first side reinforcing rubber layer 9A disposed in the side of the first bead portion 4A, and a second side reinforcing rubber layer 9B disposed in the side of the second bead portion 4B. In this embodiment, each side reinforcing rubber layer 9 has a radially inner end 9a being adjacent to the axially inside of the bead apex rubber component 8 through the main portion 6a of the carcass ply 6A. Furthermore, each side reinforcing rubber layer 9 has a radially outer end 9b being located in the vicinity of the axially outer edge 7e of the belt layer 7.

While the radial height Hs of the side reinforcing rubber layer 9 is not particularly limited, run-flat performance may not sufficiently be exhibited when the height Hs is excessively small. On the other hand, when the height Hs is excessively large, an excessive increase in mass of tire and poor ride comfort may be delivered. In view of above, the height Hs of the side reinforcing rubber layer 9, for example, is set in a range of from 35% to 70% in relation to the tire section height H.

Since the run-flat tire having side reinforcing rubber layers 9 may have high bending rigidity on its sidewall portion 3, deflection of the sidewall portions 3 during run-flat traveling may be reduced. In order to improve the advantage above, the side reinforcing rubber layers 9 preferably have a complex elastic modulus $E*2$ in a range of not less than 4 MPa, more preferably not less than 6 MPa. When the complex elastic modulus $E*2$ of the side reinforcing rubber layers 9 is less than 4 MPa, it may be difficult to exhibit sufficient run-flat performance. On the other hand, when the complex elastic modulus $E*2$ of the side reinforcing rubber layers 9 is excessively large, ride comfort during ordinary traveling may be deteriorated. In view of above, the complex elastic modulus $E*2$ of the side reinforcing rubber layer 9 is preferably set in a range of not more than 12 MPa, more preferably not more than 10 MPa.

The respective sidewall rubber components 10 are disposed axially outside the carcass 6 in the sidewall portions 3 in such a manner that the sidewall rubber components 10 are directly adjacent to the carcass 6 and form part of the outer surface of the tire. The sidewall rubber components 10 include a first sidewall rubber component 10A disposed in the side of the first bead portion 4A, and a second sidewall rubber component 10B disposed in the side of the second bead portion 4B. Each sidewall rubber component 10 is made of relatively low elasticity modulus rubber having excellent properties in flexibility and cut resistance. The sidewall rubber components 10 may flexibly deform along with the carcass 6 during run-flat traveling and ordinary drive, thereby mainly protecting the carcass 6 for improving its cut resistance.

In view of above, the sidewall rubber component 10 preferably has its complex elastic modulus $E*1$ in a range of not less than 3 MPa, more preferably not less than 4 MPa. When the complex elastic modulus $E*1$ of the sidewall rubber component 10 is less than 3 MPa, it may be difficult to exhibit sufficient cut resistance. On the other hand, when the complex elastic modulus $E*1$ of the sidewall rubber component 10 is excessively large, the sidewall rubber components 10 may be separated from the carcass 6 during run-flat traveling. In view of above, the complex elastic modulus $E*1$ of the sidewall rubber component 10 is preferably in a range of not more than 7 MPa, more preferably not more than 6 MPa.

As shown in FIG. 1, the first side reinforcing rubber layer 9A in the side of the first bead portion 4A has a thickness B1 greater than a thickness B2 of the second side reinforcing rubber layer 9B in the side of the second bead portion 4B, at the tire maximum-width position in the tire cross section including the tire axis under the standard condition of the tire. Furthermore, the first sidewall rubber component 10A in the side of the first bead portion 4A has a thickness A1 smaller than a thickness A2 of the second sidewall rubber component 10B in the side of the second bead portion 4B, at the tire maximum-width position above.

The run-flat tire 1 as described above may be reduced the deflection in the side of first bead portion 4A. Thus, run-flat durability of the tire may be improved by providing the first bead portion 4A at the side where damage tends to concentrate. Furthermore, the relatively thin second side reinforcing rubber layer 9B disposed in the side of the second bead portion 4B may prevent from the increase in vertical spring constant and mass of the tire, thereby improving riding comfort and fuel efficiency.

Here, the "side where the damage tends to concentrate" refers to the side of a center line of a vehicle (inboard of the tire) with respect to the rear wheels of the vehicle. Generally, the rear wheel has a negative camber arrangement in many cases. Thus, the run-flat tires installed on the rear wheels of the vehicle are subjected to a large tire load on its inboard during traveling, and damage tends to concentrate thereto. Accordingly, in order to improve run-flat durability of the tire, the first bead portion 4A is preferably arranged as the inboard of the tire.

Furthermore, the "side where the damage tends to concentrate" refers to the outside of a vehicle (outboard of the tire) with respect to the front wheels of the vehicle. Generally, the front wheel is subjected to a large tire load during cornering. Thus, when the run-flat tire 1 is installed on the front wheel of the vehicle, the first bead portion 4A is preferably arranged as the outboard of the tire.

In order to reduce heat developed from the sidewall portions 3 during run-flat traveling, the side reinforcing rubber layers 9 are preferably made of a low heat-generating rubber. Preferably, the side reinforcing rubber layers 9 have a loss tangent (tan δ2) in a range of from 0.03 to 0.06.

The sidewall rubber component 10 preferably has a loss tangent (tan δ1) greater than a loss tangent (tan δ2) of the side reinforcing rubber layer 9 in each sidewall portion. During traveling, the sidewall rubber components 10 generate heat based on the deformation of the sidewall portions 3. Since the sidewall rubber components 10 are exposed to the outside air, heat developed from the sidewall rubber components 10 may effectively be dissipated to the atmosphere. Accordingly, the sidewall rubber components 10 having the relatively high loss tangent may improve durability of the sidewall portions 3 while maintaining ride comfort. In view of above, the loss tangent (tan δ1) of the sidewall rubber components 10 is preferably set in a range of from 0.10 to 0.15.

In this specification and claims, a loss tangent of rubber is measured under the same condition as complex elastic modulus described above.

The sidewall rubber component 10 preferably has a complex elastic modulus $E*1$ smaller than a complex elastic modulus $E*2$ of the side reinforcing rubber layer 9. Thus, the side reinforcing rubber layer 9 may reduce the deflection of the sidewall portions 3 during run-flat traveling. Accordingly, the sidewall rubber component 10 may be prevented separating from the carcass 6, even when the sidewall portion 3 deform in large.

The respective sidewall portions 3 preferably have approximately the same thicknesses. More preferably, the respective thicknesses of the sidewall portions 3 are formed as a symmetrical manner with respect to the tire equator C. Thus, such a run-flat tire may stably be molded using a conventional bladder, thereby maintaining its productivity.

In view of above, the respective thicknesses A1, A2, B1 and B2 satisfy the following relation:

$$0.9 \leq (A1+B1)/(A2+B2) \leq 1.1.$$

When the ratio A2/A1 between the thickness A1 of the first sidewall rubber component 10A and the thickness A2 of the second sidewall rubber component 10B, and the ratio B1/B2 between the thickness B1 of the first side reinforcing rubber layer 9A and the thickness B2 of the second side reinforcing rubber layer 9B are excessively small, it may be difficult to exhibit sufficiently run-flat performance. When the ratios A2/A1 and B1/B2 are excessively large, steering stability and ride comfort during ordinary drive may be deteriorated due to the relatively high durability of the first bead portion 4A. In view of above, the respective thicknesses A1, A2, B1 and B2 satisfy the following relations:

$$1.4 \leq A2/A1 \leq 2.0; \text{ and}$$

$$1.15 \leq B1/B2 \leq 1.4.$$

While the particularly preferable embodiments of the present invention have been described in detail, the present invention in not limited to the illustrated embodiments, but can be modified and carried out in various aspects.

Comparison Test

Run-flat tires of 225/55R17 having the basic structure of FIG. 1 except for details shown in Table 1 were made, and tested with respect to its run-flat traveling distance, tire mass, and vertical spring constant. Test methods are as follows.

Run-flat Traveling Distance Test:

Each test tire was mounted on a wheel rim of 17×7J with an inner pressure of 0 kPa without a valve core, and installed to the rear wheel with a camber angle of set to −2 degrees of a FR vehicle with a displacement of 3,500 cc. The test driver drove the vehicle at a speed of 80 km/h on a test course of 3,500 m long which includes corners of R150 and R110, and measured its runnable distance. The results are indicated in Table 1 by an index based on Ref. 1 being 100, wherein the larger the value, the better the performance is.

Tire Mass Test:

Each test tire mass was measured. The results are indicated in Table 1 by an index based on Ref. 1 being 100, wherein the smaller the value, the lighter the mass is.

Vertical Spring Constant Test:

The vertical deflection of each test tire mounted on the wheel rim above was measured under the inner pressure of 230 kPa and vertical load of 4.7 kN plus/minus 1.0 kN. Then, the spring constant that is a vertical load per the vertical deflection of 1 mm is calculated. The results are indicated by an index based on Ref. 1 being 100. The smaller the index, the better the ride comfort is.

Uniformity Test:

Lateral force variation (LFV) of each test tire was measured using a tire uniformity test machine based on the Method of uniformity test for vehicle tires defined by JASO C607:2000. The results are indicated by an index based on Ref. 1 being 100. The larger the index, the better the uniformity is. The measurement condition was as follows:

Wheel rim size: 17×7J;
Tire rotational speed: 60 rpm;
Internal pressure: 200 kPa; and
Vertical tire load: 4.0 kN.

Productivity Test:

The productivity of each test tire was evaluated by molding each tire using a tire molding bladder having a symmetrical shape under the following standard:

A: the number of defective products is not more than 0.5%;

B: the number of defective products is more than 0.5%, but not more than 1.0%; and C: the number of defective products is more than 1.0%.

Test results are shown in Table 1.

TABLE 1

|  | Ref. 1 | Ref. 2 | Ref. 3 | Ex. 1 | Ex. 2 | Ex. 3 | Ex. 4 | Ex. 5 |
| --- | --- | --- | --- | --- | --- | --- | --- | --- |
| First sidewall rubber component thickness A1 (mm) | 3.5 | 2.5 | 4.5 | 3 | 2.5 | 2.5 | 3 | 3 |
| Second sidewall rubber component thickness A2 (mm) | 3.5 | 2.5 | 4.5 | 4 | 4.5 | 4 | 4 | 4 |
| Ratio A2/A1 | 1 | 1 | 1 | 1.33 | 1.8 | 1.6 | 1.33 | 1.33 |
| First side reinforcing rubber layer thickness B1 (mm) | 8.5 | 9.5 | 7.5 | 9 | 9.5 | 9 | 9 | 9 |
| Second side reinforcing rubber layer thickness B2 (mm) | 8.5 | 9.5 | 7.5 | 8 | 7.5 | 7.5 | 8 | 8 |
| Ratio B1/B2 | 1 | 1 | 1 | 1.13 | 1.27 | 1.2 | 1.13 | 1.13 |
| (A1 + B1)/(A2 + B2) | 1 | 1 | 1 | 1 | 1 | 1 | 1 | 1 |
| Loss tangent tan δ1 of sidewall rubber component | 0.14 | 0.14 | 0.14 | 0.14 | 0.14 | 0.14 | 0.06 | 0.14 |
| Loss tangent tan δ2 of side reinforcing rubber layer | 0.04 | 0.04 | 0.04 | 0.04 | 0.04 | 0.04 | 0.08 | 0.04 |
| Complex elastic modulus of sidewall rubber component E*1 (MPa) | 5 | 5 | 5 | 5 | 5 | 5 | 5 | 7 |
| Complex elastic modulus of side reinforcing rubber layer E*2 (MPa) | 8 | 8 | 8 | 8 | 8 | 8 | 8 | 6 |
| Run-flat traveling distance (Index) | 100 | 120 | 80 | 120 | 150 | 120 | 110 | 105 |
| Tire mass (Index) | 100 | 100 | 100 | 100 | 100 | 95 | 100 | 100 |
| Vertical spring constant (Index) | 100 | 110 | 90 | 100 | 100 | 97 | 100 | 95 |
| Uniformity (Index) | 100 | 100 | 100 | 100 | 100 | 100 | 100 | 100 |
| Productivity | A | A | A | A | A | A | A | A |

|  | Ex. 6 | Ex. 7 | Ex. 8 | Ex. 9 | Ex. 10 | Ex. 11 | Ex. 12 | Ex. 13 |
| --- | --- | --- | --- | --- | --- | --- | --- | --- |
| First sidewall rubber component thickness A1 (mm) | 3.5 | 4 | 4.4 | 5 | 2.9 | 2.3 | 3 | 2.5 |
| Second sidewall rubber component thickness A2 (mm) | 3.3 | 3 | 2.5 | 2 | 4 | 4.6 | 4 | 4.5 |
| Ratio A2/A1 | 0.94 | 0.75 | 0.57 | 0.4 | 1.4 | 2 | 1.33 | 1.8 |
| First side reinforcing rubber layer thickness B1 (mm) | 7.5 | 7.4 | 8.1 | 8.1 | 9 | 9 | 9.1 | 9.8 |
| Second side reinforcing rubber layer thickness B2 (mm) | 10.4 | 9.6 | 8.9 | 8.9 | 8 | 8 | 7.9 | 7 |
| Ratio B1/B2 | 0.72 | 0.77 | 0.91 | 0.91 | 1.13 | 1.13 | 1.15 | 1.4 |
| (A1 + B1)/(A2 + B2) | 0.8 | 0.9 | 1.1 | 1.2 | 0.99 | 0.9 | 1.02 | 1.07 |
| Loss tangent tan δ1 of sidewall rubber component | 0.14 | 0.14 | 0.14 | 0.14 | 0.14 | 0.14 | 0.14 | 0.14 |
| Loss tangent tan δ2 of side reinforcing rubber layer | 0.04 | 0.04 | 0.04 | 0.04 | 0.04 | 0.04 | 0.04 | 0.04 |
| Complex elastic modulus of sidewall rubber component E*1 (MPa) | 5 | 5 | 5 | 5 | 5 | 5 | 5 | 5 |

TABLE 1-continued

| | | | | | | | | |
|---|---|---|---|---|---|---|---|---|
| Complex elastic modulus of side reinforcing rubber layer E*2 (MPa) | 8 | 8 | 8 | 8 | 8 | 8 | 8 | 8 |
| Run-flat traveling distance (Index) | 160 | 150 | 120 | 120 | 125 | 130 | 125 | 160 |
| Tire mass (Index) | 99 | 100 | 100 | 100 | 100 | 100 | 100 | 99 |
| Vertical spring constant (Index) | 103 | 100 | 100 | 100 | 100 | 100 | 100 | 100 |
| Uniformity (Index) | 90 | 95 | 95 | 90 | 100 | 95 | 100 | 98 |
| Productivity | C | B | B | C | A | B | A | A |

As shown in Table 1, it was confirmed that the Example tires improved run-flat traveling distance while maintaining its spring constant and tire mass compared to the Reference tires.

DESCRIPTION OF THE REFERENCE NUMERALS

2 Tread portion
3 Side wall portion
4 Bead portion
5 Bead core
6 Carcass
7 Belt layer
8 Bead apex rubber component
9 Side reinforcing rubber layer
10 Sidewall rubber component

The invention claimed is:

1. A run-flat tire comprising:
a carcass extending between bead cores each disposed in a first bead portion and a second bead portion, through a tread portion and sidewall portions,
a pair of side reinforcing rubber layers made of rubber having a high hardness, and each having a crescent cross-sectional shape and disposed axially inside the carcass in each sidewall portion, and
a pair of sidewall rubber components each disposed axially outside the carcass in each sidewall portion in such a manner that the sidewall rubber components are directly adjacent to the carcass and form part of the outer surface of the tire,
wherein the side reinforcing rubber layers comprise a first side reinforcing rubber layer disposed in the side of the first bead portion, and a second side reinforcing rubber layer disposed in the side of the second bead portion,
wherein the sidewall rubber components comprise a first sidewall rubber component disposed in the side of the first bead portion, and a second sidewall rubber component disposed in the side of the second bead portion,
wherein at a tire maximum-width position in a tire cross section including a tire axis under a standard condition in which the tire is mounted on a standard rim and is inflated to a standard pressure, but no tire load is loaded, the first side reinforcing rubber layer has a thickness B1 greater than a thickness B2 of the second side reinforcing rubber layer, and the first sidewall rubber component has a thickness A1 smaller than a thickness A2 of the second sidewall rubber component, and
wherein the respective thicknesses A1, A2, B1 and B2 satisfy the following relationships:

$1.4 \leq A2/A1 \leq 2.0$; and $1.15 \leq B1/B2 \leq 1.4$.

2. A method for mounting the run-flat tire according to claim 1 on a four-wheeled vehicle, comprising a step of
mounting the run-flat tire on a rear wheel of the four-wheeled vehicle so that the first bead portion is arranged at an inboard side of the rear wheel.

3. A method for mounting the run-flat tire according to claim 1 on a four-wheeled vehicle, comprising a step of
mounting the run-flat tire on a front wheel of the four-wheeled vehicle so that the first bead portion is arranged at an outboard side of the front wheel.

4. The run-flat tire according to claim 1,
wherein a loss tangent (tan δ1) of the sidewall rubber component is greater than a loss tangent (tan δ2) of the side reinforcing rubber layer in each sidewall portion, and
wherein a complex elastic modulus E*1 of the sidewall rubber component is smaller than a complex elastic modulus E*2 of the side reinforcing rubber layer in each sidewall portion.

5. The run-flat tire according to claim 4, wherein the respective thicknesses A1, A2, B1 and B2 satisfy the following relationship:

$0.9 \leq (A1+B1)/(A2+B2) \leq 1.1$.

6. A method for mounting the run-flat tire according to claim 4 on a four-wheeled vehicle, comprising a step of
mounting the run-flat tire on a rear wheel of the four-wheeled vehicle so that the first bead portion is arranged at an inboard side of the rear wheel.

7. A method for mounting the run-flat tire according to claim 4 on a four-wheeled vehicle, comprising a step of
mounting the run-flat tire on a front wheel of the four-wheeled vehicle so that the first bead portion is arranged at an outboard side of the front wheel.

8. The run-flat tire according to claim 1, wherein the respective thicknesses A1, A2, B1 and B2 satisfy the following relationship:

$0.9 \leq (A1+B1)/(A2+B2) \leq 1.1$.

9. A method for mounting the run-flat tire according to claim 8 on a four-wheeled vehicle, comprising a step of
mounting the run-flat tire on a rear wheel of the four-wheeled vehicle so that the first bead portion is arranged at an inboard side of the rear wheel.

10. A method for mounting the run-flat tire according to claim 8 on a four-wheeled vehicle, comprising a step of
mounting the run-flat tire on a front wheel of the four-wheeled vehicle so that the first bead portion is arranged at an outboard side of the front wheel.

* * * * *